April 20, 1926.
C. A. HILL
COMPRESSION COUPLING
Filed Feb. 6, 1922
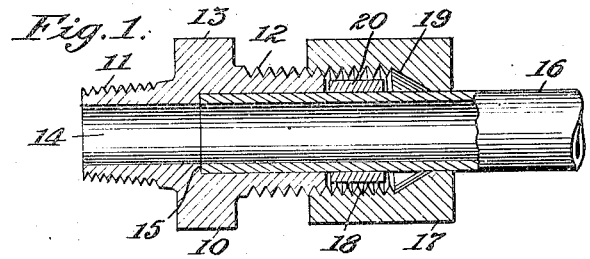
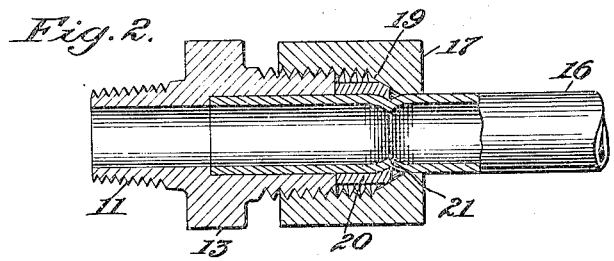
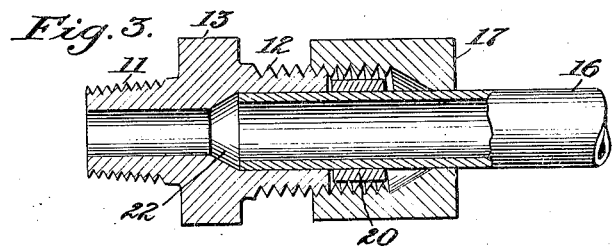
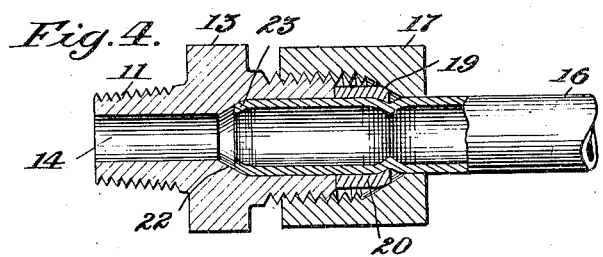
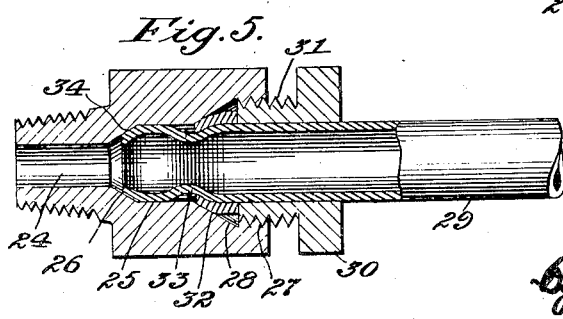
Inventor:
Charles A. Hill,
By Cushman, Bryant & Darby
Attys.

Patented Apr. 20, 1926.

1,581,538

UNITED STATES PATENT OFFICE.

CHARLES A. HILL, OF PORT HURON, MICHIGAN, ASSIGNOR TO ADOLPH MUELLER, TRUSTEE, OF DECATUR, ILLINOIS.

COMPRESSION COUPLING.

Application filed February 6, 1922. Serial No. 534,579.

*To all whom it may concern:*

Be it known that CHARLES A. HILL, a citizen of the United States, residing at Port Huron, in the county of St. Clair and State of Michigan, has invented new and useful Improvements in Compression Couplings, of which the following is a specification.

This invention relates to a coupling for joining the ends of pipes, or for securing the end of a pipe or similar member to any other opposed fitting, such as a nipple attached to a tank or the like.

More particularly this invention has for its object, the provision of a compression member formed of any suitable ductile metal, such as brass or copper, which is arranged on the outer periphery of the pipe to be coupled, and disposed between the union of the coupling and the coupling nut, so that when the nut is threaded to the union, one at least of the ends of the compression member is brought into contact with a tapered or bevelled shoulder, in one of the coupling members, and is spun inward into biting and locking engagement with the outer periphery of the pipe, thereby providing a fluid tight joint, which will effectively seal the parts together, and will dispense with the use of fibrous or other special forms of packings now in common use.

A further improved feature of this invention consists in forming the main bore of the union or fitting, with a recessed portion connected to the main bore by a tapered or bevelled shoulder, which is preferably formed at an angle of about 30° to the horizontal, so that when the end of the pipe is brought into contact with the shoulder, and the parts are drawn together, the end is swaged down into the bore, thus forming an additional locking and sealing means for the coupling.

In the accompanying drawings, Figure 1 is a longitudinal section showing a coupling assembled, but not set up or tightened.

Figure 2 is a similar view with the coupling set up.

Figure 3 is a longitudinal sectional view showing the recessed union provided with a tapered or bevelled shoulder, and the coupling assembled but not set up or tightened.

Figure 4 is a view similar to Figure 3 with the coupling set up.

Figure 5 is a longitudinal sectional view of a coupling showing a modified form of the invention.

Referring to the drawings, wherein like numerals indicate like parts in the several figures, 10 designates a union or fitting of any suitable form or type, which in the present disclosure is formed with externally threaded ends 11 and 12, and the hexagonal center nut or portion 13; the nut 13 thus providing means for attaching the threaded end 11 to any desired structure or fitting, such as a gasoline tank or the like.

The interior of the main bore 14 of the union 10, is provided with a counterbored or enlarged recess, having an abutting shoulder 15, adapted to receive the inner end of the member to be coupled, in the present instance, the pipe 16. The coupling nut 17, designed to engage the end 12 of the union, is provided with a longitudinally threaded recess 18, the inner end of which recess 18 terminates in a tapered or bevelled shoulder 19, formed preferably at about an angle of 30° to the horizontal, although the angle of inclination may vary, the purpose of which will subsequently be described.

The compression member or ring 20, which may be formed by cutting sections from a continuous pipe of any ductile metal, such as brass or copper, is of such diameter as to permit it to be easily slipped over the end of the pipe 16, and snugly fit in the space formed between the outer periphery of the pipe 16, and the threaded portion of the recess 18, in the coupling nut 17.

The outer end of the compression ring 20, when the nut 17 is threaded to the union 10, is arranged to abut against the end of the member 12, while its opposite end, which contacts with the tapered shoulder 19, is subjected to the spinning action of the nut 17, as the latter is rotated and set up, which causes said end to be distorted and spun inward into biting and locking engagement with the pipe 16, thus forming in the peripheral wall of said pipe the indentation or groove 21, so as to provide a fluid tight and interlocked connection of the parts, as clearly shown in Figure 2.

In Figures 3 and 4, wherein are shown a slightly modified form of the invention, the counterbored recessed portion of the union is provided with a tapered or bevelled shoulder 22, formed approximately at an angle of 30° to the horizontal, and so arranged that when the coupling members are drawn together, the inner end 23 of the pipe 16, will contact with the shoulder 22, and be swaged inward, so as to form a joint at this point, which will provide a double sealing of the parts, and give a more effective coupling.

In the modified form of the invention shown in Figure 5, the union or fitting 24' has the main bore 24 connected to the counterbored recess 25 by a tapered shoulder 26. The forward end of the recess 25 is similarly connected to the threaded portion 27 by a tapered shoulder 28. The inner end of the pipe 29 is arranged to fit in the recess 25, and to contact with the tapered shoulder 26. The coupling nut 30 is formed with an externally threaded stem portion 31, adapted to be secured to the threaded portion 27 of the union. The compression ring 32, which slidingly fits the pipe 29, has one end contacting with the bevelled shoulder 28, and its opposite end abutting against the end 31 of the nut 30. When the nut 30 is threaded into the union 23, the forward end of the compression member 32 is swaged inward into biting and locking engagement with the outer wall of the pipe 29, forming the locking groove 33 in the outer periphery of said pipe.

Simultaneously, the end 34 of the pipe contacting with the tapered shoulder 26, is swaged inward, as shown, thus providing an additional locking means, which renders it practically impossible for the fluid to work past the double seals and escape through the screw threads of the coupling nut.

The thickness of the compression ring, and the inclination of the tapered shoulder, formed in either the union or the coupling nut, may be varied depending upon the type of tubing on which the coupling is used. Thus for instance, where the pipe to be coupled is formed of very thin tubing, it would be desirable to make the compression ring relatively thick in cross section, and the taper in the nut or the union of low pitch or taper, so that the compression ring will bite into and form a secure joint with the pipe, yet the strength and resistance of the compression ring will be such as to provide against a too great an indentation of and collapsing of the pipe.

It is to be understood that the form of invention herein shown and described is to be taken as a preferred embodiment of the same, and that changes and modifications in construction and arrangement of parts may be made, and still remain within the spirit of the invention and the scope of what is claimed.

I claim:

In a coupling of the class described, the combination of a union having a bore of unequal diameters connected by a tapered wall, a coupling nut threaded to one end of said union and having a bore with a tapered wall inclined in an opposite direction to the tapered wall of the union, a pipe adapted to engage the tapered wall in said union, and a compression member surrounding said pipe and abutting the end of said union, the opposite end of the compression member engaging the tapered wall in said nut, whereby when said union and nut are drawn together the end of the pipe and the opposite end of the compression member will be compressed and tapered by the oppositely tapering walls of said union and nut.

In testimony whereof I have hereunto set my hand.

CHARLES A. HILL.